United States Patent [19]

Darves et al.

[11] 4,224,957

[45] Sep. 30, 1980

[54] MODULAR SYSTEM FOR OBTAINING PNEUMATIC LOGIC CIRCUITS

[75] Inventors: Maurice Darves, La Chausse St Victor; Roland Martinet, Blois, both of France

[73] Assignee: Climax France S.A., Blois, France

[21] Appl. No.: 915,810

[22] Filed: Jun. 15, 1978

[30] Foreign Application Priority Data

Jun. 17, 1977 [FR] France .................. 77 18714

[51] Int. Cl.$^3$ .................................. F15C 5/00
[52] U.S. Cl. .................. 137/270; 137/884
[58] Field of Search .................. 137/270, 884

[56] References Cited

U.S. PATENT DOCUMENTS

| 3,875,959 | 4/1975 | Bouteille . | |
| 4,027,692 | 6/1977 | Bouteille et al. | 137/270 |

FOREIGN PATENT DOCUMENTS

| 2452945 | 5/1975 | Fed. Rep. of Germany | 137/884 |
| 2515050 | 10/1975 | Fed. Rep. of Germany | 137/884 |
| 2654930 | 6/1977 | Fed. Rep. of Germany | 137/884 |
| 2302433 | 9/1976 | France | 137/884 |

*Primary Examiner*—Gerald A. Michalsky

[57] ABSTRACT

The invention relates to a method and a pneumatic system which permit the definition of the logic equations of the various sequences of a machine cycle and the assembling of the various components processing said logic equations by juxtaposing them one after another along a same line with automatic setting up of certain interconnections between the components through the medium of the bases supporting said components. Furthermore the structure of said bases permit the juxtaposition on the same line of several functional components such as storage modules and logic modules.

9 Claims, 21 Drawing Figures

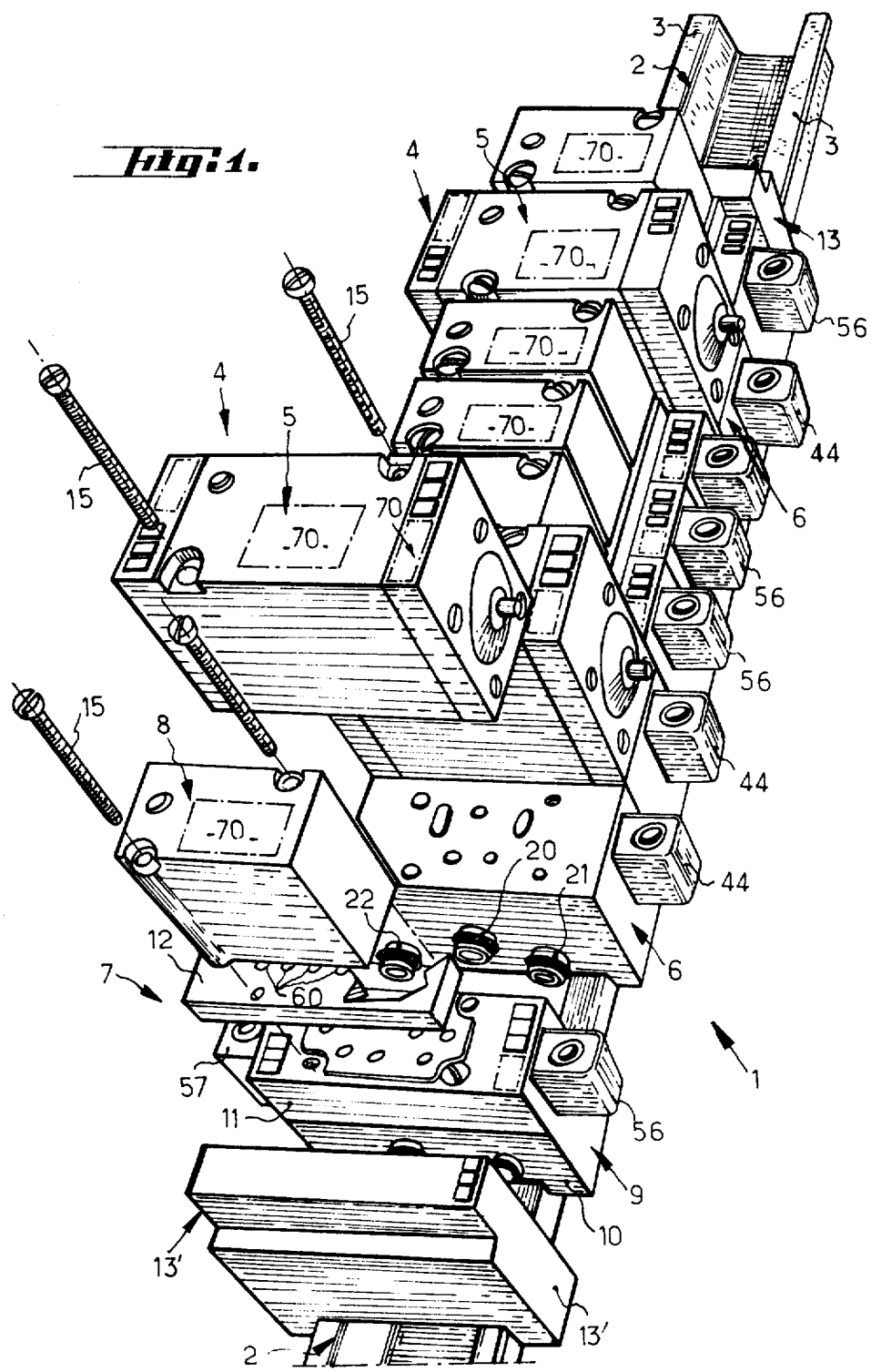

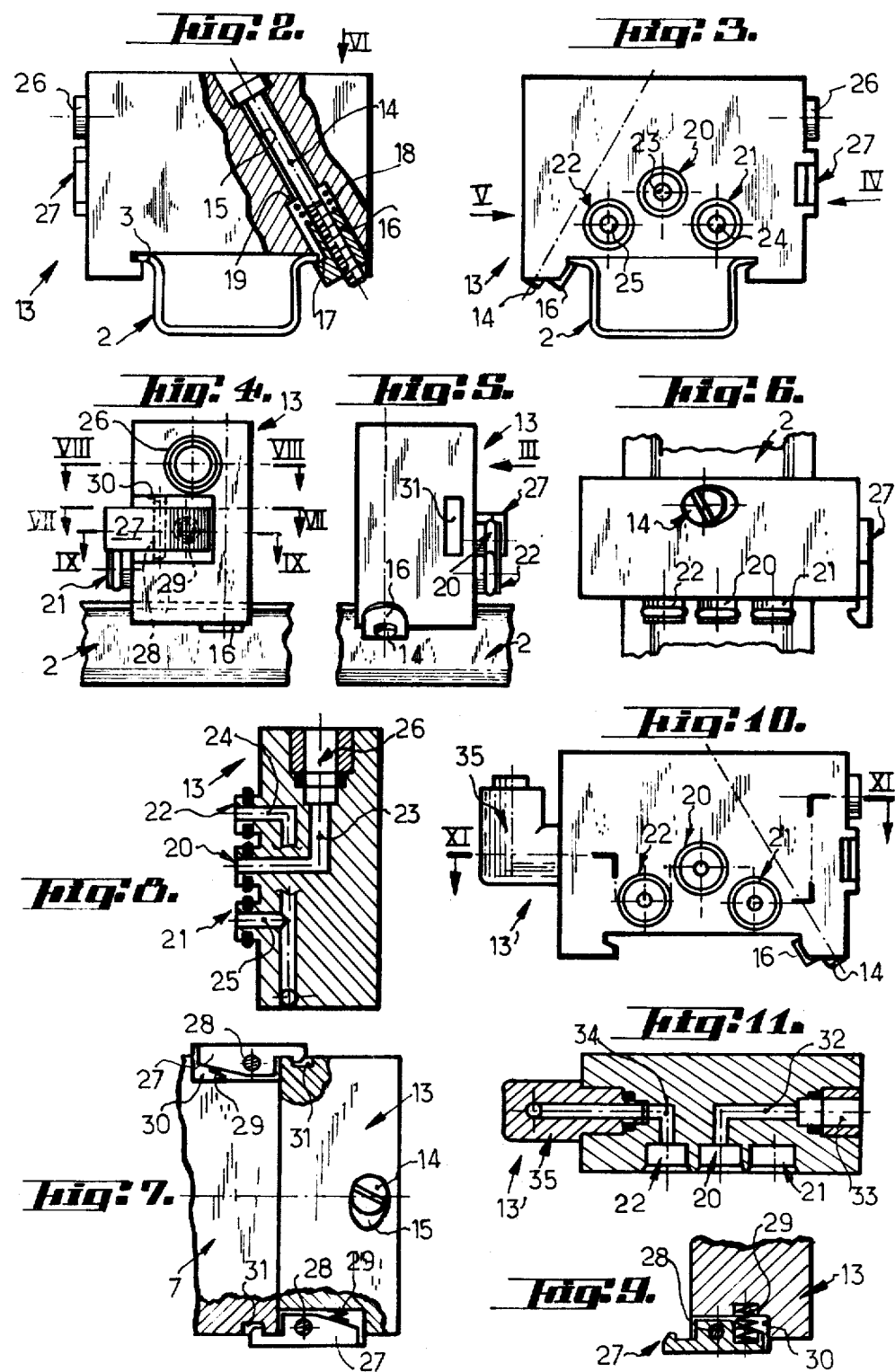

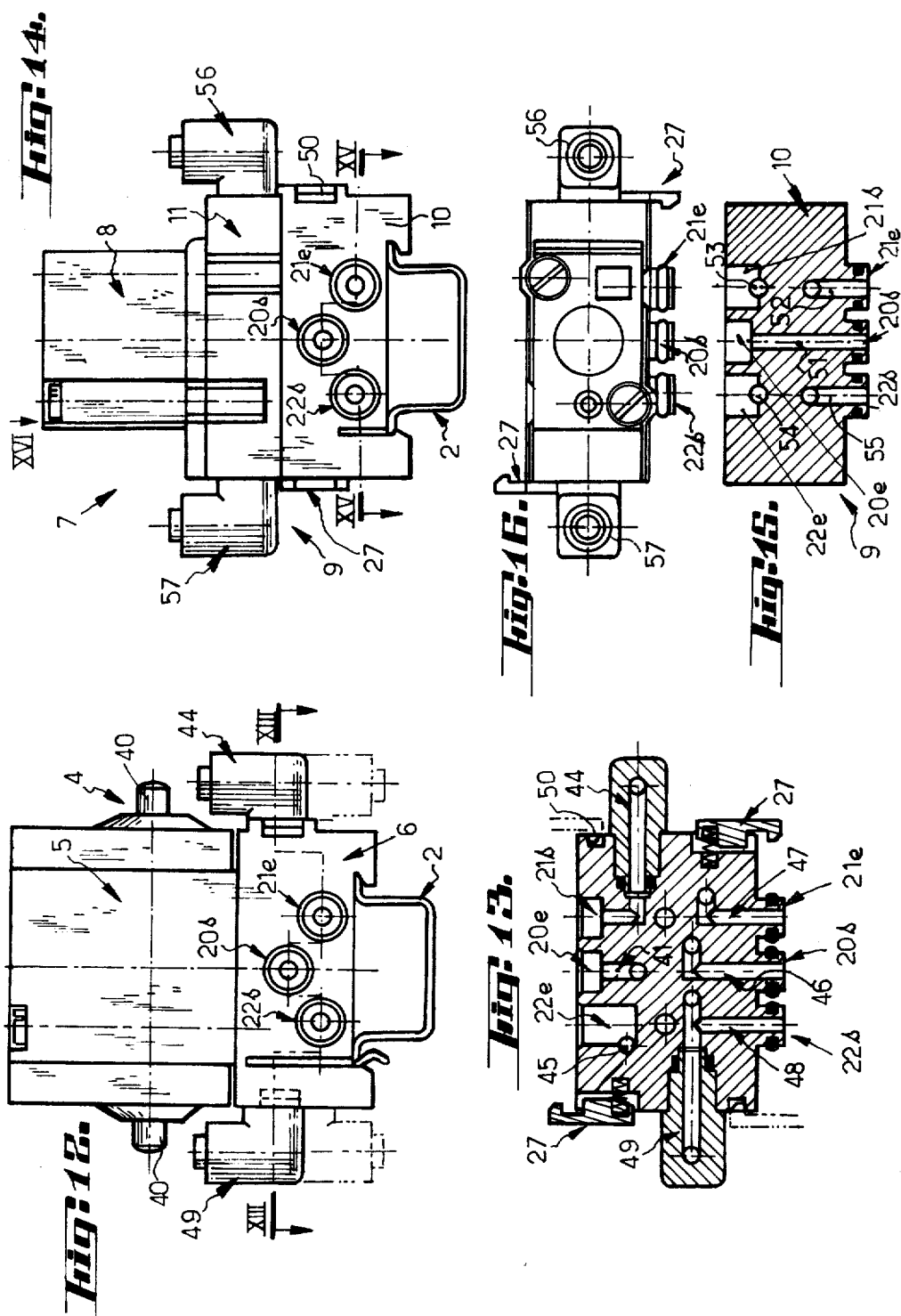

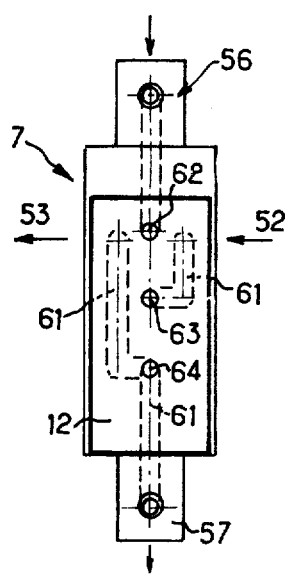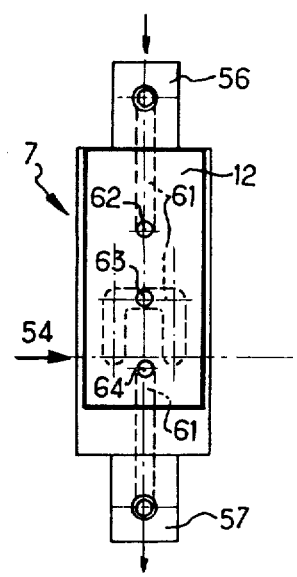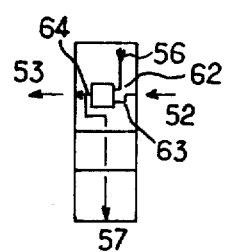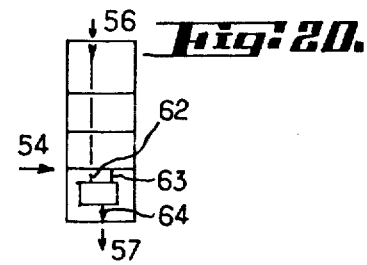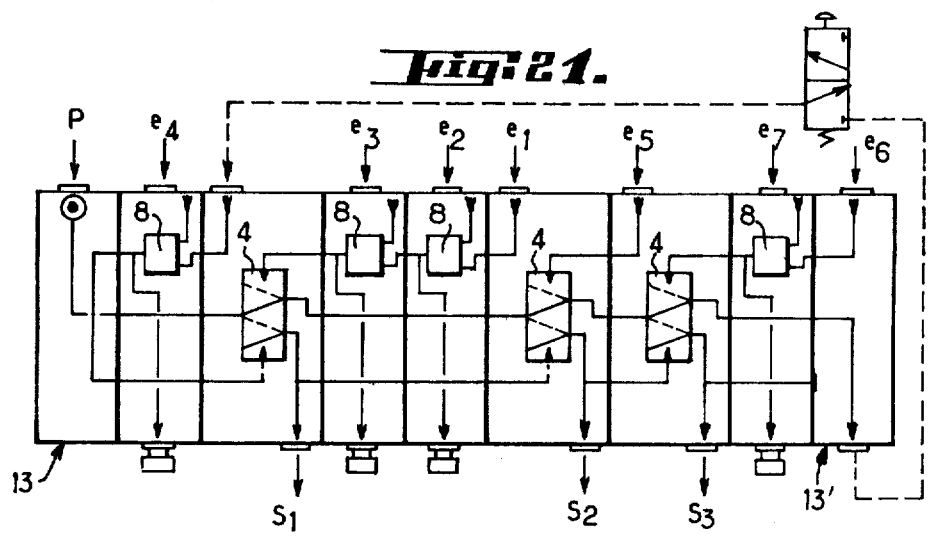

MODULAR SYSTEM FOR OBTAINING PNEUMATIC LOGIC CIRCUITS

The invention relates generally to a modular system for obtaining logic circuits, particularly pneumatic logic circuits, and more particularly to a method of assembling modular elements for obtaining logic control circuits for the automation of a working cycle of, for example, a machine, as well as the system for carrying out the said method.

Such modular systems already exist and are generally constituted by an association of functional elements such as storage modules, modules fulfilling logic AND, OR, NOT time-delay or other functions, which are mounted on a support through the medium of connecting bases. Relatively compact systems can now be obtained by endeavouring to minimize as much as possible the length of the interconnections between the various modules.

However, the manner in which the existing designs of modules can be arranged on the support depends almost exclusively upon the inter connections to be provided between the various modules; there is no existing modular system which provides for complete flexibility in mounting, independently of the logic control circuits to be implemented.

Certain types of arrangements have emerged, but limited by the nature of the modules used. Thus, in cases involving the use of storage modules and of modules performing conventional logic functions, use is made of either an association of several storage modules between themselves by juxtaposing them along a first line and an association of several modules performing logic functions by juxtaposing them along a second line with flexible interconnections, or of an arrangement of the various modules along a line, the latter alternative being feasible only if among all the modules there is only one storage module. Otherwise stated, in complex cases, the arrangement of the various modules of a system is necessarily performed in several directions.

The invention has for its purpose to obviate the above drawbacks by allowing an arrangement of the various modules to be effected in all cases by juxtaposing them along a same line by using appropriate connecting bases on which are mounted the various control elements.

To this end, the invention provides a method of assembling functional components such as at least one bistable storage, cells performing logic AND, OR, NOT, time-delay or other functions, for obtaining logic control circuits, particularly pneumatic logic circuits, for example in the case of automation of the working cycle of a machine, the said components being mounted on bases which are themselves mounted on a support and intended to provide the pneumatic interconnections between the various components, characterized in that it consists in defining the logic equations of the various sequences of the machine cycle, and in mounting the various components on the said support by juxtaposing them to one another along a same line, with automatic setting up of certain pneumatic interconnections between the components through the medium of their bases.

According to another characterizing feature of the method according to the invention, several bistable storages and several cells may be juxtaposed along a same line.

According to another characterizing feature of the invention, the various outlets of the components associated with the controls of the machine present themselves one after another in the direction of progress of the various sequences of the working cycle of the machine.

The invention also provides a modular system for carrying out the above method, characterized in that it comprises a single rail serving as a support for the bases of the functional components resiliently lockable on the said rail, the said bases automatically ensuring pneumatic logic interconnections between the said elements, and in that it comprises an initial module and a final module mounted at both ends of the chain defined by the whole set of juxtaposed components rigidly lockable on the said rail.

According to another characterizing feature of the system according to the invention, each storage module comprises a storage cell removably mounted on a base comprising a conduit for the transfer of the storage feed pressure, pilot conduits for storage writing and clearing, respectively, and two external connections, one of which is used for connection to the writing pilot conduit of the base of an adjacent storage or to a control conduit of the base of an adjacent cell, whereas the other serves as an outlet communicating with the clearing pilot conduit of the base of the other adjacent storage or with the control conduit of the base of the other adjacent cell.

According to another characterizing feature of the system according to the invention, each cell is removably mounted on a base comprising a channel extending right through it to ensure the transfer of the storage feed pressure, control conduits located at the same level as the pilot conduits of a storage, and two external connections.

According to another characterizing feature of the system according to the invention these various conduits of two adjacent modules automatically communicate with one another when juxtaposed.

According to another characterizing feature of the system according to the invention, between each cell and its base is mounted a removable selector plate capable of assuming two positions allowing the said pilot conduits to be acted upon.

According to another characterizing feature of the system according to the invention, the bases of the cells may be reversed or inverted on the support rail.

According to a first advantage of the invention, the reasoning leading to the circuits solving a given problem is considerably simplified by using rational logic with cells corresponding to each of the basic functions, readily associable with one another.

According to another advantage of the invention, considerable simplification of the obtention of a circuit is obtained since all the elements are juxtaposed to one another substantially in the order of the control sequences to be performed.

According to another advantage of the invention, various types of circuits can be designed to meet all cases of arrangements:

very simple circuits with a few logic functions, where the interconnections can be performed by means of flexible ducts in a conventional manner;

circuits with combinative functions by associating logic functions (AND, OR, NOT,) by means of bases associable with integrated intercomponent conduits;

circuits with a sequential function by associating a storage function and the functions of the pilot equations of that storage by means of bases associable with integrated intercomponent conduits;

circuits with a sequential function by associating a storage and its piloting functions, with combinative functions at the outputs of that storage by means of bases associable with integrated intercomponent conduits;

sequential circuits for devices known as "step-by-step devices", usually designated by the terms "sequencers" or "sequence distributors", constituted by an association of storages and possibly of logic functions necessary for the operation of the "step-by-step" arrangement obtained by means of components mounted on bases associable with integrated intercomponent conduits. This type of circuit allows in particular for simple automation of automatic machine cycles;

circuits of the sequential type in which complementary combinative functions are associated directly in the chain by means of associable bases for conditioning the outputs of the "step-by-step" arrangement. This device allows, among other things, the automation of series of machines with a sequential cycle according to the "cascade" method, the whole arrangement thus obtained being in the form of a single chain with integrated intercomponent connections.

Other advantages, characterizing features and details will appear more clearly from the following explanatory description with reference to the appended drawings given solely by way of example and wherein:

FIG. 1 is a partially broken-away, exploded perspective view showing the assembly of the various modules on a support rail;

FIG. 2 is a partially broken-away elevational view of the initial module of the chain or feeding module;

FIG. 3 is a sectional view in the direction of arrow III of FIG. 5, again illustrating the initial module of the chain;

FIG. 4 is a view in the direction of arrow IV of FIG. 3;

FIG. 5 is a view in the direction of arrow V of FIG. 3;

FIG. 6 is a view in the direction of arrow VI of FIG. 2;

FIG. 7 is a view upon the line VII—VII of FIG. 4, partially broken-away to show the coupling of two adjacent modules;

FIG. 8 is a sectional view upon the line VIII—VIII of FIG. 4;

FIG. 9 is a detailed view upon the line IX—IX of FIG. 4, partially broken-away to show a detail of a catch for coupling two adjacent modules;

FIG. 10 is an elevational view of the final module of the chain;

FIG. 11 is a sectional view upon the line XI—XI of FIG. 10;

FIG. 12 is an elevational view of a storage module according to the invention mounted on the support rail;

FIG. 13 is a sectional view upon the line XIII—XIII of FIG. 12;

FIG. 14 is an elevational view of a module equipped with a cell with its base mounted on the support rail;

FIG. 15 is a sectional view upon the line XV—XV of FIG. 14;

FIG. 16 is a view in the direction of arrow XVI of FIG. 14;

FIG. 17 diagrammatically illustrates the connections performed by the selector associated with a cell according to a first position;

FIG. 18 diagrammatically illustrates the function performed by the cell of FIG. 17;

FIG. 19 diagrammatically illustrates the connections ensured by the selector associated with a cell in a second position;

FIG. 20 diagrammatically illustrates the function performed by the cell of FIG. 19; and FIG. 21 shows in the form of a logic diagram one form of embodiment according to the invention.

In FIG. 1 is shown a first form of embodiment of the invention wherein all the modules are juxtaposed one after another so as to define a continuous chain extending in a single direction. In this chain are shown the various modules whose functions allow a pneumatic logic assembly to be obtained to meet a given problem such as for example that of the automation of the working cycle of a machine.

The assembly 1 comprises a metal rail 2 of U-shaped section with two flanges 3 bent substantially at 90° outwardly.

On the metal rail are mounted the various modules, namely storage modules 4 comprising the store 5 proper and its base 6 resiliently locked on the rail 2 through the medium of the flanges 3, modules 7 fulfilling logic functions (AND, OR, NOT, time-delay, etc.) comprising a cell 8 fulfilling the logic function, a base 9 in two superposed portions 10, 11 also resiliently locked on the rail 2, and a selector plate 12 mounted between the cell 8 and the base portion 11, a module 13 at the beginning of the chain or feeding module, and a final module 13' mounted at the other end of the chain, the said modules 13 and 13' being rigidly locked on the rail to maintain in position the whole set of elements of the chain.

It is to be noted that each store 5 and each cell 8 with its selector 12 is screwed on the corresponding base through the medium of screws 15. Referring to FIGS. 2 to 9, an initial module 13 of the chain will be described in detail according to a particular form of embodiment represented only diagrammatically in FIG. 1.

The initial module 13 is resiliently mounted on the flanges 3 of the metal rail 2 by being simply snap-fitted thereon. To maintain the module 13 in position on the rail, it is locked through the medium of a screw 14 mounted in an oblique bore 15 opening at one end at the upper surface of the module and at the other end at the lower surface of the said module and outside the rail. In the enlarged lower portion of the bore 15 is mounted on the screw an internally threaded sleeve 16 provided on its peripheral surface with a shoulder intended to cooperate with the adjacent flange 3 of the rail. Between the end surface of the sleeve 16 and the shoulder 19 defined by the two portions of the bore 15 is mounted a return spring 18. This locking system operates as a screw-and-nut gear, the role of the spring 18 being to retract the catch sleeve 16 during the untightening to thus facilitate the disassembling.

Referring particularly to FIGS. 3, 6 and 8, the initial module 13 is provided on its face confronting the adjacent module with three connections 20, 21, 22 which communicate with three internal conduits 23, 24, 25, respectively, the two conduits 24 and 25 communicating with one another, but without opening outwardly, whereas the conduit 23 opens outwardly through an integrated instantaneous or quick-fitting connection 26 located on a lateral wall of the module 13. Through this conduit is supplied the feed pressure for the storage modules.

Referring particularly to FIGS. 2, 3, 4, 5 and 9, the initial module 13 is equipped with a coupling catch 27 pivoted on a pin 28 and co-operating with a return spring 29 to allow the coupling between the initial module 13 and the adjacent module. The catch 27 is placed in a lateral slot 30 of the module in a substantially horizontal position so as to be able to co-operate by its free end projecting beyond the module with a slot 31 of the adjacent module (FIG. 7). Likewise, the module adjacent to the initial module 13 is equipped with a catch 27 adapted to co-operate with a slot 31 of the initial module 13 provided on its lateral surface opposite to the one supporting the catch pertaining to the initial module 13.

The final module 13' of the chain will be described with reference to FIGS. 10 and 11. This module of a shape substantially identical with that of the initial module 13 is locked on the metal rail 2 in manner identical with that of the initial module 13. This module is provided with three connections 20, 21, 22 on its face confronting the adjacent module. The connection 20 communicates with a conduit 32 the other end of which opens outwardly through the medium of an integrated instantaneous or quick-fitting connection 33. The conduit 32 corresponds to the conduit for pressure feeding to the storage module and opens onto a lateral face of the unit 13'. As for the connection 22, it is connected to a conduit 34 which communicates with a pivotally mounted quick-fitting or instantaneous connection 35 provided on the other lateral face of the unit 13'. The pivotal connection 35 may assume two positions by being rotated through 180° to allow for either forward or rearward connection. The connection 21 of the final element 13' does not open into any conduit, but only closes the conduit associated with the connection 21 of the adjacent module.

Referring to FIGS. 12 and 13, a storage module according to the invention will be described. This module 4 comprises the store 5 proper and a base 6 resiliently locked on the rail 2 and ensuring the pneumatic interconnections between the store 5 and the other modules. The store 5 is of a type known per se and comprises for example five orifices plus two pilot orifices, and is provided on each of its faces parallel with the longitudinal axis of the rail 2 with a hand-operable auxiliary control push-button 40. At the top of the storage are provided signal means (not shown), e.g. red-colored, indicating whether one of the outputs of the storage is under pressure, the said signal means being retracted by a spring in the absence of such pressure.

The base 6 of the store 5 is provided on its face confronting the initial module 13 with three connections 20e, 21s, 22e. The connection 20e corresponds to the input of feed pressure to the storage from the initial unit 13 and communicates through a conduit 41 with the feed inlet orifice of the storage. The connection 21s communicates directly with a pivotally mounted external connection 44 provided on a lateral surface of the storage. The connection 22e communicates through the medium of a conduit 45 with the clearing pilot inlet orifice of the storage.

On the surface of the storage opposite the final element 13' are also provided three connections 20s, 21e and 22s. Connection 20s axially aligned with the connection 20e communicates through the medium of a conduit 46 with the feed pressure outlet orifice of the storage to supply the same to the adjacent module. The connection 21e axially aligned with the connection 21s of the other face of the storage communicates through a conduit 47 with the writing pilot inlet orifice of the storage. The connection 22s axially aligned with the connection 22e of the other face communicates through a conduit 48 with the outlet orifice of the storage and communicates also with an external pivotally-mounted connection 49 located on the lateral surface of the storage opposite the one supporting the first external connection 44.

The storage 4 is equipped with two pivotal catches allowing it to be assembled to the adjacent modules, the said pivotal catches 27 being mounted on the lateral surfaces of the storage co-operate with the two modules adjacent to the said storage, respectively. On both lateral surfaces of the storage are also provided two slots 50 to receive the catches 27 of the two adjacent modules, respectively. The external connections 44 and 49 are also pivotally mounted connections capable of assuming two positions at 180° from one another.

Referring to FIGS. 14 to 16, there will now be described in more detail the module 7 of FIG. 1 fulfilling a logic function AND, OR, NOT, time-delay. This module comprises a cell 8 performing a logic function proper which is thread-fastened to a base 9. The base 9 comprises a first portion 10 resiliently locked at its lower portion on the rail 2 and is provided on its face confronting the initial module 13 with three connections 20s, 21e, 22s, and on its face confronting the final element 13' with three connections 20e, 21s, 22e axially aligned with the three connections of the other face, respectively. The connections 20e and 20s communicate directly with one another through the medium of a conduit 51. The connections 21e, 21s, 22e, 22s communicate with the cell through the medium of conduits 52, 53, 54, 55, respectively.

The second portion 11 of the base carries laterally two pivotally mounted connections, i.e. an inlet connection 56 and an outlet connection 57, which are fixed in either forward or rearward interconnecting position by the assembly of the two portions of the base, with an interposed sealing device (not shown). On the second portion 11 of the base is mounted the cell 8 with an interposed selector 12 whose role will be explained hereafter.

It should be noted that all the connections 20s, 21e and 22s are male integrated connections, whereas the connections 20e, 21s and 22e are female connections.

Referring to FIGS. 17 to 20, the function of the selector associated with the cells 8 will now be described. The selector 12 is constituted by a plate provided on its surface opposite the cell 8 with inlet-outlet orifices associated with the cell, and which communicate on the other hand with the conduits 61 provided in the selector plate to co-operate with the external connections 56 and 57 of the base portion 11, and with the conduits 52, 53, 54, 55 of the base portion 10.

In FIG. 17 is represented the first position of selector 12 which:

communicates the inlet external connection 56 of the cell with the inlet orifice 62 proper of the said cell, communicates the second inlet orifice 63 of the cell with the conduit 52 of the base corresponding to the inlet connection 21e of that base, communicates the outlet orifice 64 of the cell with, on the one hand, the external outlet connection 57 of the cell, and on the other hand with the conduit 53 corresponding to the outlet connection 21s of the cell base.

Consequently, in this first position, considering a storage juxtaposed to a cell in the direction from the initial unit 13 to the final unit 13', with the inlet external connection 56 of the cell and the inlet external connection 49 of the storage located on a same side, the output of the cell acts upon the writing pilot circuit of the storage. In a second position represented in FIGS. 19 and 20, the selector, after being rotated through 180° causes:

the inlet orifice 62 of the cell to communicate with the inlet external connection 56, the second inlet 63 of the cell to communicate with the conduit 54 of the base which corresponds to the clearing conduit 22e, the outlet orifice 64 of the cell to communicate with the outlet external connection 57.

Under such conditions, with the juxtaposition of a storage with a cell in the direction from the initial module 13 to the final module 13', but with the inlet external connections 56 of the cell and 44 of the storage on one and the same side, the inlet 63 of the cell is influenced by the output of the storage which, through its outlet connection 22s, communicates with the connection 22e of the cell.

It is important to note that the second portion 11 of the base 9 of a cell may be mounted in two positions with respect to the first portion 10 of that base through 180° rotation, whereas this is not possible for the storage module.

Thus, in the foregoing example showing the role of the selector of the cell when the latter is juxtaposed to a storage module, but the inlet external connections 56 of the cell and 49 of the storage are no longer on one and the same side, then for the two selector positions represented in FIGS. 17 and 19, respectively, the output of the cell, in the first case, acts upon the storage clearing piloting, i.e. upon the conduit 45 of its base, whereas in the second position of the selector, an inlet of the cell is influenced by the inlet external connection 44 of the cell which is connected to the latter through the conduit 43 and the outlet connection 21s of the cell.

Of course, in these examples, a cell associated with a storage is considered, but this also applies to any two modules.

In FIG. 21 is represented by way of example and illustration a logic circuit ensuring for example predetermined controls through the medium of its outlets $S_1$, $S_2$, $S_3$ from seven inlets $e_1$ to $e_7$ by juxtaposing between the initial module 13 and the final module 13' a succession of storages 4 and cells 7.

It can thus be observed that the pneumatic circuit ensuring for example the writing piloting of the stores takes place in a same direction, whereas the feeding of the stores with pressure and the clearing piloting thereof, are effected in an opposite direction. Moreover, as regards both the storage module and the cells, their change can be effected without touching the bases and the selectors, thus permitting rapid interventions.

Referring to FIG. 1, it is to be noted that each module is provided with an indication 70 allowing the function of the module to be identified. Bases secured to the support rail 3 and supporting separately mounted components can also be associated with the modules which have been described.

Of course the invention is by no means limited to the forms of embodiment described and illustrated, which have been given by way of example only. In particular, it comprises all means constituting technical equivalents to the means described as well as their combinations should the latter be carried out according to its gist and used within the scope of the following claims.

What is claimed is:

1. A method of assembling pneumatic active functional logic cells performing a bistable storage function with pneumatic passive logic component cells performing AND, OR, NOT, time-delay and other logic functions, for the automation of a machine working cycle, said cells being mounted on connecting bases, said connecting bases providing coupling means for multiple pneumatic transmission passages on opposed sides of said bases and on at least a third side, with internal passages between said coupling means to provide signal and power transmission functions, said third side providing a surface for mounting said cells on said bases, and said first and second sides providing a uniform configuration for coupling by juxtaposition, said bases being mounted on a linear support and intended to perform pneumatic interconnections between the various cells, comprising the steps of: selecting the cells to be used for performing desired logic functions, including at least two active cells; and mounting said cells on said connecting bases juxtaposed one cell after another in a linear manner along said support with automatic setting up of pneumatic interconnections between said cells through the juxtaposition of the said coupling means of said connecting bases.

2. A system for assembling at least one pneumatic active logic cell performing a bistable storage function with pneumatic passive logic cells performing AND, OR, NOT, time-delay and other logic functions for obtaining the automation of a machine working cycle, comprising connecting bases on which are mounted said cell, a rail serving as a support for said bases which are resiliently lockable on said rail, said bases automatically ensuring logic pneumatic connections between said cells, an initial module and a final module mounted at both ends of the chain defined by the whole series of juxtaposed cells, wherein each active cell is removably mounted on a base comprising a storage feed pressure transfer conduit, pilot conduits for storage writing and for clearing respectively, controlled by the adjacent cells, and two external connecting fittings, one for connection of the writing pilot conduit to the connecting base of an adjacent cell, whereas the other said connecting fitting serves as an output orifice in communication with the connecting base of the other cell adjacent to said active cell.

3. A system according to claim 2, wherein a plurality of active cells and a plurality of passive cells are mounted on said rail.

4. A system according to claim 3, wherein each passive cell is removably mounted on a connecting base, said base comprising a conduit extending right through it for transmitting said storage feed pressure, at least two control conduits for controlling the said passive cell and located substantially at the same level as said pilot conduits of a connecting base on which is mounted an active cell for ensuring an automatic pneumatic interconnection with said pilot conduits, and two external connecting fittings.

5. A system according to claim 4, wherein said external connecting fittings are supported by a removable portion of the connecting base which is secured to the base portion fastened to the said rail.

6. A system according to claim 5, wherein said external connecting fittings of the active and passive cells are movable angularly and can assume at least two positions 180° apart and are lockable in position during the assembling of the cells.

7. A system according to claim 4, wherein said connecting bases are assembled to one another through pivotal catch means.

8. A system according to claim 3, wherein between each said passive cell and its associated connecting base is mounted a removable selector plate which can assume at least two positions allowing said pilot conduits to be differentially acted upon.

9. A system according to claim 8, wherein the active and passive cells mounted on a single rail ensure all the logic functions for obtaining the automation of a machine working cycle.

* * * * *